United States Patent [19]

Hazama et al.

[11] 4,245,903
[45] Jan. 20, 1981

[54] PHOTOGRAPHIC CAMERA

[75] Inventors: Kiyoaski Hazama; Koichi Katsumoto, both of Hachioji, Japan

[73] Assignee: Konishiroku Photo Industry Co., Ltd., Tokyo, Japan

[21] Appl. No.: 85,274

[22] Filed: Oct. 16, 1979

[30] Foreign Application Priority Data

Oct. 17, 1978 [JP] Japan ................................. 53/126922

[51] Int. Cl.³ ....................... G03B 17/04; G03B 17/52
[52] U.S. Cl. ...................................... 354/86; 354/150; 354/187
[58] Field of Search .................................. 354/83–86, 354/126, 150, 187, 192–194

[56] References Cited

U.S. PATENT DOCUMENTS

| 3,958,257 | 5/1976 | Johnson | 354/83 |
| 4,128,322 | 12/1978 | Stemme et al. | 354/83 |
| 4,176,934 | 12/1979 | Lermann et al. | 354/86 X |
| 4,184,759 | 1/1980 | Ito et al. | 354/86 |

Primary Examiner—John Gonzales
Attorney, Agent, or Firm—Bierman & Bierman

[57] ABSTRACT

A foldable camera of the self-developing type having a body portion mounting an objective lens and a cover member adapted to be closed against the body portion. Both the body portion and the cover member are provided with a cavity which together form a protective enclosure for the lens in the folded condition of the camera. A strobe lamp and a viewfinder are provided at locations above the cavity on the cover member.

3 Claims, 11 Drawing Figures

PHOTOGRAPHIC CAMERA

BACKGROUND OF THE INVENTION

1. Field of the Invention:

The present invention relates to a photographic camera of a self-or in situ-developing type in which use is made of a film unit containing a film processing composition in liquid phase in an integral combination with a photographic film.

2. Prior Art of the Invention:

Several types of the self- or in situ- developing film units (hereinafter referred to as the film unit) of the above kind are commercially available at present. In general, the film unit denoted by reference numeral 1 in FIG. 1 includes an exposure region 2 which is destined to be exposed to a light image of an object to be photographed and a bag 3 which is provided integrally with the exposure area 2 and adapted to contain therein a processing liquid composition for developing the latent image printed or recorded on the exposure area 2 and fixing the developed image. Upon completed photographing, the film unit 1 is forcefully discharged outwardly from the camera body through rotation of discharging rollers as is well known. In the course of the film unit 1 being discharged, the bag 3 is ruptured under the squeezing force exerted by the discharging rollers, whereby the processing liquid composition is dilated over the whole exposed area of the film to accomplish the development and the subsequent fixation. The film unit 1 may be divided into two types in view of the relation between exposure and development. In the case of the film unit of one variety, a developed image appears on one and the same face (front face) of the film that has undergone the exposure. To the contrary, in the case of the other variety, the developed image is made to appear at one face (front face) of the film when the other face (rear face) of the film has been subjected to the exposure. It should be first mentioned that the present invention concerns a photographic camera adapted to use the film unit of the first mentioned variety.

In the photographic camera herein concerned, the light rays from an object to be photographed are focussed and projected onto the exposure area 2 of the film unit 1 through an objective lens assembly 5 and a reflecting mirror system 6 arranged so as to reflect the picked-up light rays an odd number of times (accordingly at least once) on the way to the exposure area 2 of the film. Reference should be made to FIG. 2. When the light rays are focussed onto the exposure area 2 directly through the objective lens system 5, there will be produced an image on the film which is inverted in the transverse direction relative to the real image of the object.

Because of the requirement imposed on the photographic camera herein concerned that the incident light rays upon the optical system have to be reflected an odd number of times, the construction or structure of the camera is subject to severe limitation. Besides, in view of the fact that the film unit now available commercially is of a size of 90 mm×110 mm, the reflector mirror or mirrors of a correspondingly large size have to be employed, which involves necessarily remarkably large dimensions in the whole structure of the camera. Therefor, an appearance of a compact camera having good operability has been desired as there has been a great demand for cameras in which the film unit described above can be used.

A typical example of a photographic camera which is now commercially available and so designed as to solve the problem discussed above is shown in FIG. 3 of the accompanying drawings. Rays of light having passed through the objective lens system 5 are first reflected at a reflecting mirror 6 and then reflected by a reflector 7 having mirror surfaces at both sides thereof and serving also as a focussing unit. In the aiming or focussing operation, the reflected light rays from the reflector 7 are again reflected by the mirror 6 and then reflected to an eye-piece lens 9 through a concave mirror 8 to be observed as a finder image. At the instant when a shutter is released, the reflector 7 is rotated in the clockwise direction, whereby the light rays collected by the objective lens system 5 are focussed onto the film unit contained in a film cassette 10 after having been reflected by the rear mirror surface of the reflector 7. The film unit thus exposed is then caused to pass between discharging rollers 12 and undergoes development in the manner described hereinbefore. The film thus undergoing the developing treatment is then discharged outwardly from the camera body through a discharge port 13. In the inoperative state of the photographic camera of this kind, the reflector mirror 6 is adapted to be rotatably folded about an axis 11 in the direction indicated by an arrow A, while the objective lens system 5 is folded about an axis 14 in the direction indicated by an arrow B with the finder window portion including the eye-piece lens being folded together, whereby the camera can be finally collapsed to a compact configuration such as shown in FIG. 4. However, because the whole structure of the camera is constructed collapsible, the optical system for the field view finder is necessarily implemented in an inconvenient configuration such that even a slight deviation of the eye position of the user from the finder window will make the object to be photographed disappear from the observation through the view finder, involving great inconvenience in the use of the camera. Further, since the camera is unfolded or exploded to the configuration shown in FIG. 3 for photographing, some awkwardness is involved in holding the camera and hence in the attitude of the user, as the result of which deterioration in the image quality such as blurs may be undesirably produced. Moreover, the discharge port 13 for the exposed and developed film is likely to be blocked by the fingers of the hand holding the camera, whereby the film may disadvantageously be crimped. In this way, many difficulties are encountered in designing the collapsible photographic camera of the self- or in situ- developing type in compactness while assuring a facilitated manipulation.

SUMMARY OF THE INVENTION

An object of the present invention is to provide a photographic camera of a self- or in situ-developing type which can be implemented in compactness while assuring an improved handling or manipulating capability by arranging the objective lens system, reflecting mirror system, roller means and view finder within the camera body in an appropriate manner.

In view of the above and other objects which will become more apparent as the description proceeds, there is proposed according to a general aspect of the invention a photographic camera of a self-developing type which comprises a body of the camera including an objective lens system adapted to be accommodated within the camera body in the inoperative state of the camera, a film holding or supporting assembly, and a cover member adapted to be closed and opened in the direction substantially perpendicular to the camera body. The optical path of the objective lens is bent laterally toward an object to be photographed, and the film holding member is disposed in the bent optical path and is so constructed that the film may be extracted upwardly from the camera body. The cover member is formed with a concave portion or cavity for accommodating therein at least a part of the objective lens system, and a grip for holding the camera is provided at the opening side of the cover member. At least a strobe lamp unit (electronic flash unit) and a view finder are provided at locations above the cavity so as to project from and insert within the camera body, and means for limiting the open position of the cover member and holding it in the open position is provided at either the camera body or the cover member.

In the following, the invention will be described in detail in conjunction with an exemplary embodiment thereof by referring to FIGS. 5 to 11.

BRIEF DESCRIPTION OF THE DRAWINGS

In the accompanying drawings.

DETAILED DESCRIPTION OF THE PREFERRED EMBODIMENTS

Figure 5:
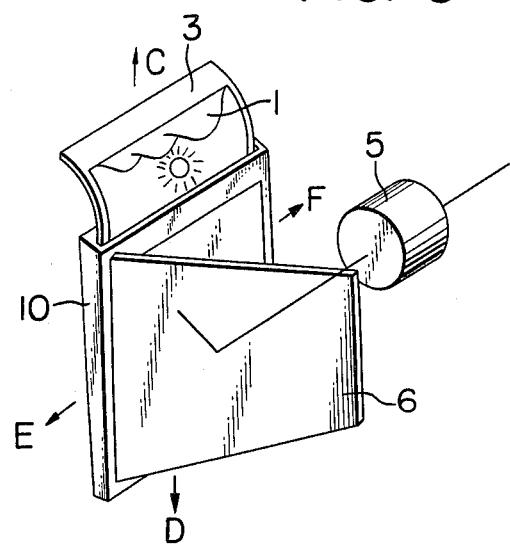
FIG. 5 is a perspective view illustrating schematically positional relationship between a film cassette and a reflecting mirror.

One of the important points to be considered in the constructing of the self-developing or in situ-developing photographic camera of the type described hereinbefore resides in the disposition of the film cassette and the discharge rollers. In the case of the hitherto known camera shown in FIG. 3, the film cassette 10 is disposed at the bottom of the camera, while the rollers 12 are disposed at the front side of the camera body adjacent to the film discharge opening 13 which is also provided at the bottom portion of the camera body. In this connection, it has been experimentally ascertained that the film processing liquid tends to be unevenly distributed over the exposure area of the film, involving undesirably non-developed image portions, unless the film unit is bent with a certain angle immediately after the passage through the rollers 12. Accordingly, when the film cassette is disposed at the bottom of the camera body, the film discharge opening 13 is also necessarily provided in the vicinity of the bottom. Generally, the camera is naturally held by the left hand of the user at the bottom surface of the camera body. Consequently, there may arise the danger of the film discharge opening being inadvertently blocked by the fingers of the left hand. Of course, it would be unnatural for the user to hold and support the camera in other manners without any possibility of blurs in the photographed image. Such being the circumstances, the film cassette should be disposed at another position in order to avoid the inconveniences described above. To this end, it is conceived to dispose the film cassette at a lateral side of the camera body, as illustrated in FIG. 5, while the direction in which the film is extracted outwardly may be selected from four directions indicated by arrows C, D, E and F. Among these directions, the directions D and E are not preferred in view of the fact that the hand is laid under the camera body and that the discharging direction E is oriented toward the user. In the case of the direction F, the bag 3 containing the processing liquid composition is positioned vertically along the longitudinal axis thereof, incurring the possibility that the processing liquid may not be dilated all over the exposed area of the film even under the squeezing action of the discharging rollers. Additionally, when the film is to be extracted outwardly in the direction E or F, a blank portion will be produced at a lateral side of the image area in correspondence to the position of the processing liquid containing bag, which is an unnatural layout for a good appearance of a finished photograph. Thus, it can be concluded that the direction C is the most preferable direction in which the film is to be extracted outwardly.

Figure 6:
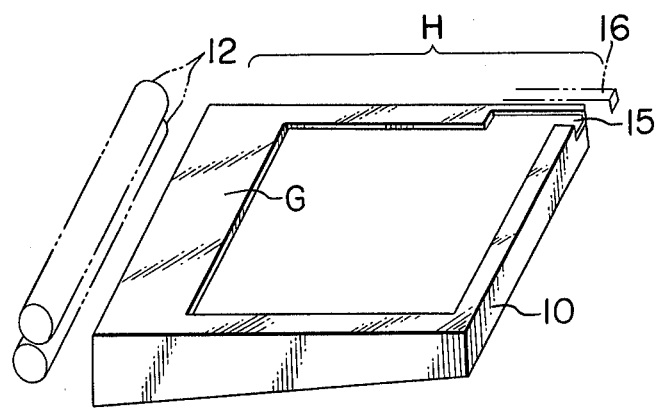
FIG. 6 illustrates schematically a positional relationship between the film cassette and rollers.

It should be mentioned here that, in the case of the self-developing type photographic camera, mechanisms for feeding the film unit 1 from the cassette 10 after the exposure as well as roller drive means are indispensably required. Although the feeding and the drive means may be manually operated or driven by an electric motor, an electric cell is incorporated in some of the film cassettes which are now on the market. On the assumption that the feeding mechanism as well as the drive means are electrically operated by an electric motor, the film cassette 10 is formed with a notch 15 at a location opposite to the portion G where the processing liquid containing bag is positioned, as is shown in FIG. 6. A claw member 16 is slidably disposed in the notch or groove 15 for feeding the film unit 1 until it has been nipped between the rollers 12. Thus, it will be readily understood that the feeding mechanism and the drive means described above should be located at a portion H of the film cassette 10 shown in FIG. 6 in order to implement the camera structure in a small or compact manner. This location corresponds to the position F shown in FIG. 5. Further, the motor for operating the feeding mechanism and the drive means should most preferably be installed at the location D shown in FIG. 5 in order to attain the desired compactness. Consequently, the portion for containing the cassette, rollers and the motor will be of an elongated configuration.

Figure 1:
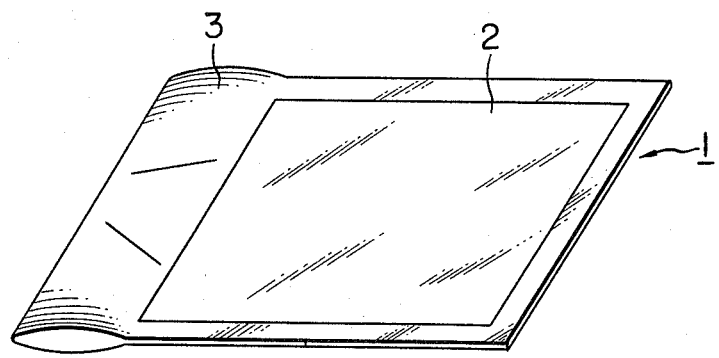
FIG. 1 is a perspective view to show a conventional film unit used in a self-developing type photographic camera.
Figure 2:
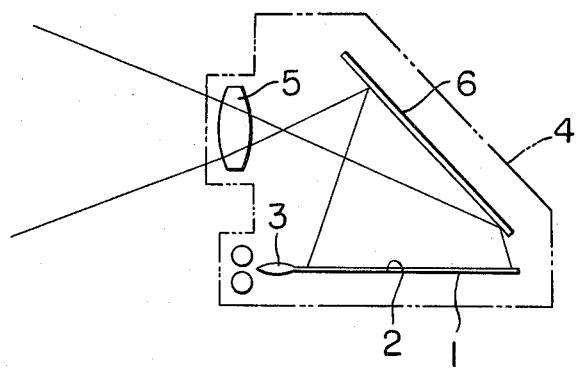
FIG. 2 illustrates schematically the principle of the self-developing type photographic camera.
Figure 3:
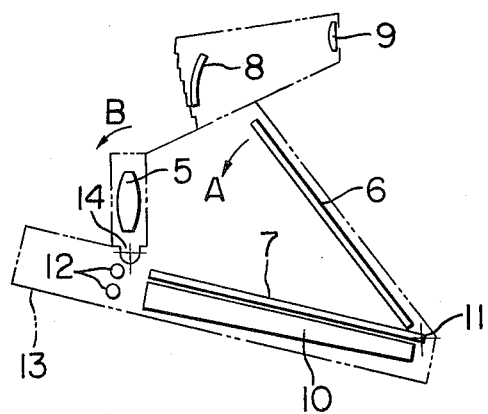
FIG. 3 is a side view to show schematically a typical one of the conventional self-developing type photographic cameras in an operative state.
Figure 4:
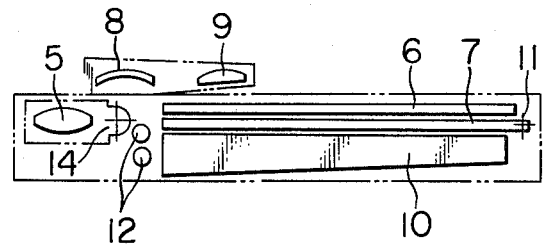
FIG. 4 is a side view of the same shown in a collapsed state.
Figure 7:
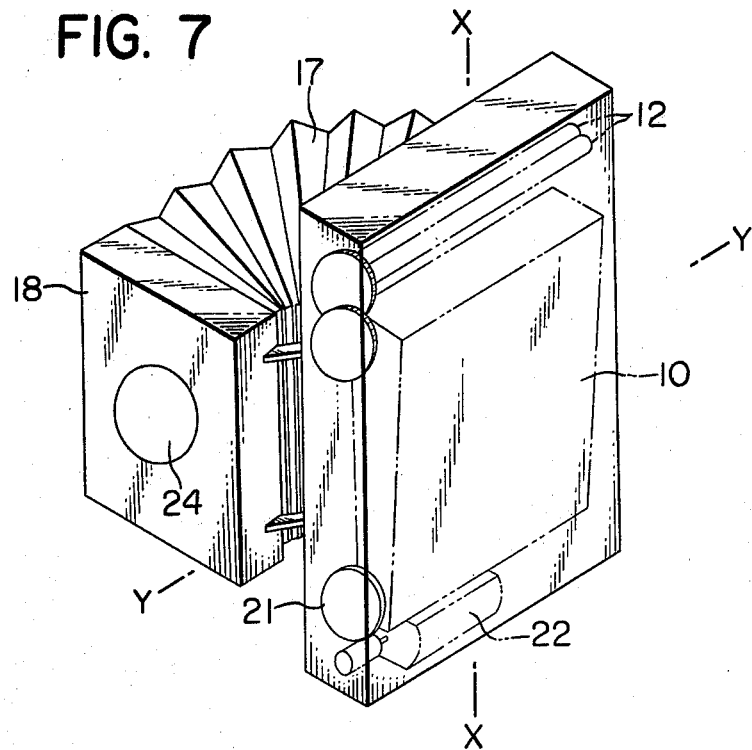
FIG. 7 is a perspective view showing a photographic camera according to an embodiment of the present invention.

In order to realize the camera in a more compact structure with a correspondingly improved portability, the reflecting mirror 6 and the objective lens system 5 should obviously be mounted in a collapsible manner. To this end, the reflector mirror 6 should be mounted so as to be folded over the film cassette 10. Additionally, the objective lens system 5 should also be mounted to be foldable over the film cassette 10 together with the reflector mirror 6. If the lens system 5 is so mounted as to be foldable in the direction away from the film cassette 10 as shown in FIG. 3, the lens system is then folded in the direction indicated by F in FIG. 5, resulting in that the lens assembly 5 projects further from the elongated configuration. In this connection, it will be noted that no technical difficulty will be encountered in disposing the lens assembly 5, the reflecting mirror 4 and the film exposure area 2 in a light-tight manner by using a bellows 17 or like expansible means as shown in FIG. 7. As shown in FIG. 7, cassette and/or film is supported by a holding assembly (not shown) prepared to the camera body.

Furthermore, it goes without saying that the film is positioned in the bent optical path formed by the bellows and a mirror (not shown) so as to be exposed in an operative condition.

For the objective lens assembly 5, a lens system of either a fixed focal point type, a zone focussing type or an automatic focussing type may be employed in combination with a simple view finder provided with a mere field frame. The automatic focussing lens system has been heretofore known and no technical problem will be involved in the use thereof for the camera of the type described herein. The objective lens system 5 may be installed as an integral unit incorporating the focussing mechanism and other required parts. Accordingly, to be more exact, for folding the camera in a collapsed state, the reflector mirror 6 disposed within the bellows 17 is first folded over the film cassette 10 and then the integral lens unit 18 of the above structure is folded.

Figure 8:
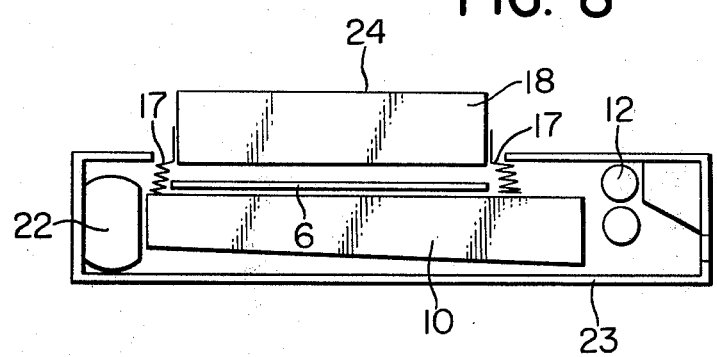
FIGS. 8 and 9 are fragmental sectional views taken along the lines X—X and Y—Y in FIG. 7, respectively.
Figure 9:
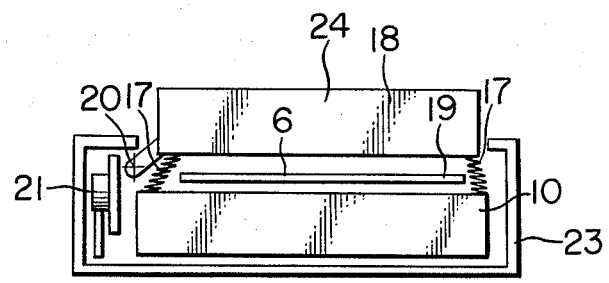

FIG. 8 shows a sectional view taken along the line X—X in FIG. 7 in the collapsed state, and FIG. 9 is a sectional view taken along the line Y—Y. In FIGS. 8 and 9, reference numeral 19 denotes an axis about which the reflecting mirror 6 is rotated, 20 denotes an axis about which the objective lens unit is rotated, 21 denotes a gear train for the drive means, and 22 designates an electric motor.

With the structure of the camera described above, the objective lens system or unit 18 projects to some degree and the portability remains to be still improved. Additionally, there is an undesirable tendency of dust or like materials adhere to the face 24 of the lens. Further, the position of the finder is not definitely defined. With a view to supplementing these shortcomings, there is provided according to the teaching of the invention a cover case 35 which has longitudinal and transverse sides comforming to those of a cartridge containing case 23, while a pivotal axis 34 is provided at the longer side in opposition to the gear train, so that the cover case can be rotated to a predetermined angle, for example, about 90° in the direction opposite to the objective lens unit 18 to be held at the open state (see FIG. 11). As can be seen in FIG. 9, the position of the pivotal axis 20 is so selected that the lens unit 18 may be collapsed in an asymmetrical position with the lateral portion at which the gear train 21 is disposed being somewhat protruded. An embodiment of the lens cover 35 is illustrated in FIG. 10.

Figure 10:
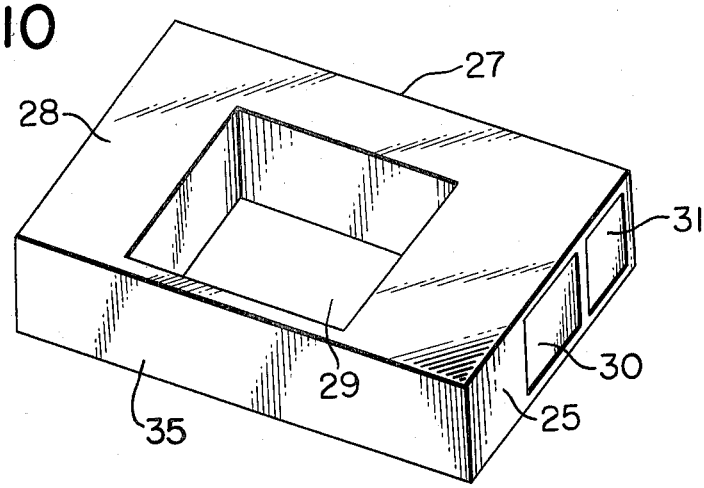
FIG. 10 is a perspective view showing a cover member of the camera according to an embodiment of the invention.
Figure 11:
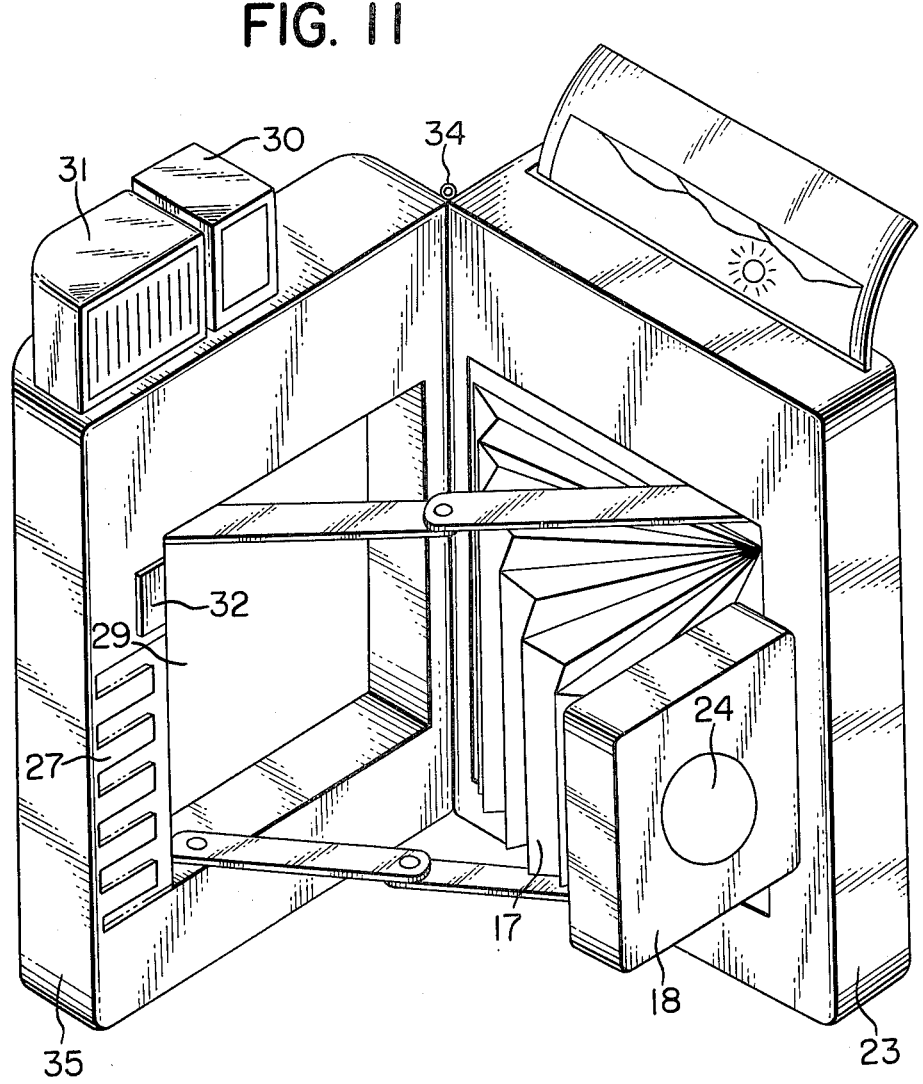
FIG. 11 is a perspective view showing a camera according to the invention.

Referring to FIG. 10, the lens cover 35 is formed with a center cavity 29 in which the lens unit 18 is accommodated. The face or wall positioned in opposition to the rollers 12 as viewed in FIG. 8 is denoted by numeral 25, while the wall located in opposition to the motor 22 is denoted by numeral 28. In FIG. 9, the wall 27 is located in opposition to the gear train 21. The finder 30 is mounted on the wall 25 vertically slidably in juxtaposition with a stobe lamp unit 31 which is also slidably mounted in the vertical direction. The slidable mounting of the strobe lamp unit has been heretofore known. The finder unit may be mounted in a similar manner as the strobe lamp unit. It will be seen from FIG. 11, that the wall 27 positioned in opposition to the gear train is adapted to be suitably held by the fingers of a right hand in the operative state of the camera shown in FIG. 11. Here, FIG. 11 shows an exemplary embodiment of the camera with relation to the present invention the camera being based on the construction shown in FIG. 7 except for inclusion of a cover case as described hereinbefore. When the shutter incorporated in the lens unit 18 is constituted by an electrically operable shutter, a release button 32 in the form of an on-off contact may be provided at the grip portion. Further, the walls 27 and 28 may be so designed as to accommodate a capacitor of a large capacity for the strobe lamp unit and an electric cell. Additionally, electric circuits for the strobe lamp unit and for controlling the discharging operation of the film may be provided in a space located in opposition to the strobe lamp unit 31. In this manner, the lens cover 35 can be effectively utilized for mounting the various components.

As will be appreciated from the foregoing description, the cover 35 serves many functions such as protection of the objective lens system, functioning as a grip for the camera, as a case for covering the finder unit and the strobe lamp unit as well as the components associated therewith for, improving the portability of the camera in the collapsed state and so forth to great advantages. As an alternative, the capacitor and the cell may be disposed at the grip portion.

What we claim is:

1. A camera of a self-developing type having an objective lens system adapted to be accommodated within a camera body in an inoperative state of the camera and to project therefrom in an operative state for photographing operation, and a film holding assembly, said camera comprising;

a cover member adapted to be closed against and opened with respect to the camera body, said cover member including a cavity for accomodating therein at least a part of the objective lens system;

a view-finder and a strobe lamp unit on said cover member at locations above the cavity;

a light-tight means for forming a bent optical path in said operative state for photographing operation; and means for removing a photographed film upwardly from the camera body.

2. A camera as set forth in claim 1 wherein the camera body is positioned at a left-hand side of a primary optical path of the objective lens system when it is directed toward an object to be photographed, and further comprising hinge means coupling the camera body and the cover member to each other, and means for limiting the open position of the cover member comprising cross means coupled to the camera body and the cover member.

3. A camera as set forth in claim 1 wherein the cover member is opened and retained substantially perpendicularly against the camera body in the operative state.

* * * * *